Nov. 9, 1937.    J. HAILEY    2,098,237
FULL CIRCLE BOOM CRANE
Filed Aug. 17, 1936    4 Sheets-Sheet 1
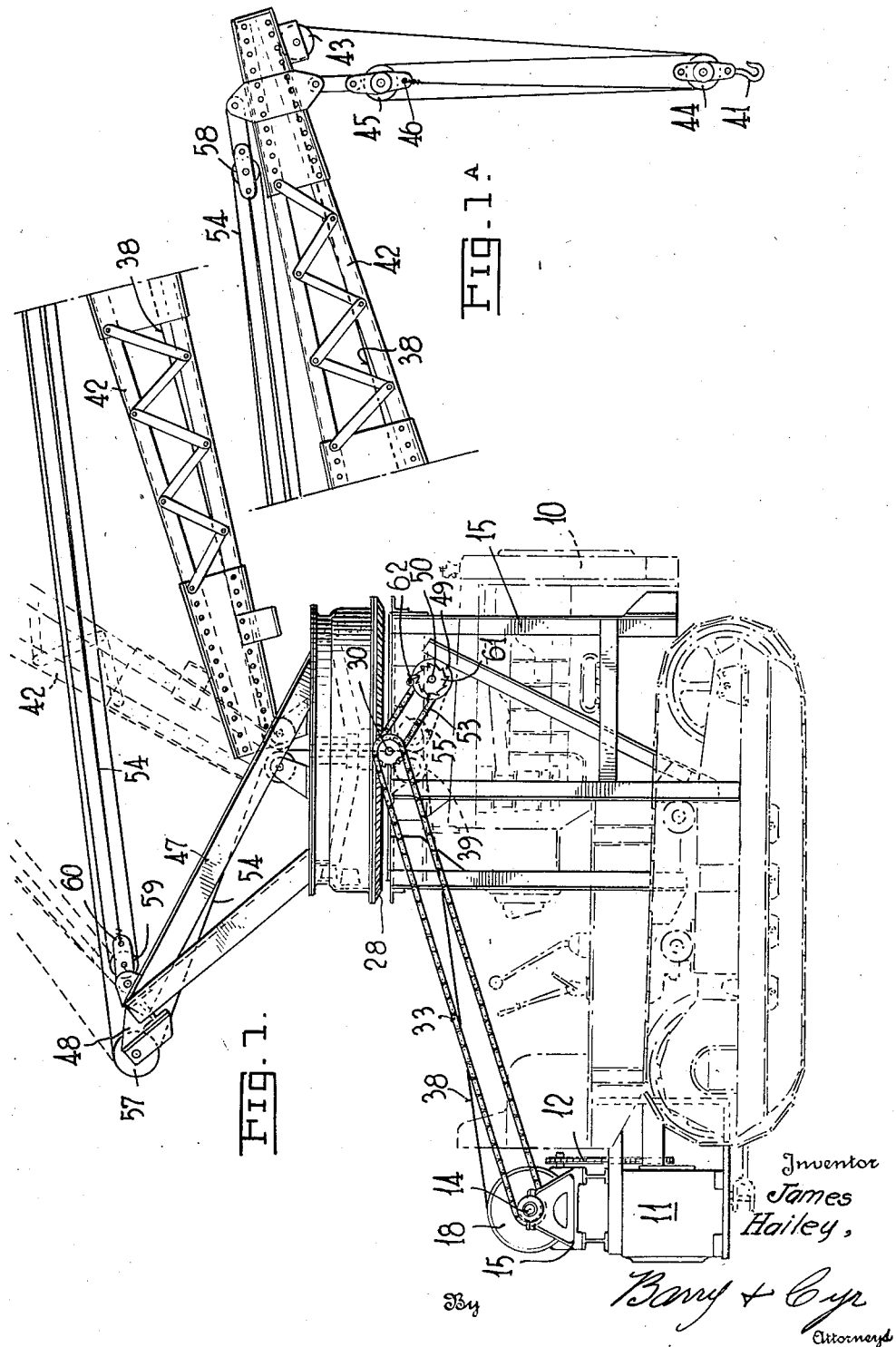

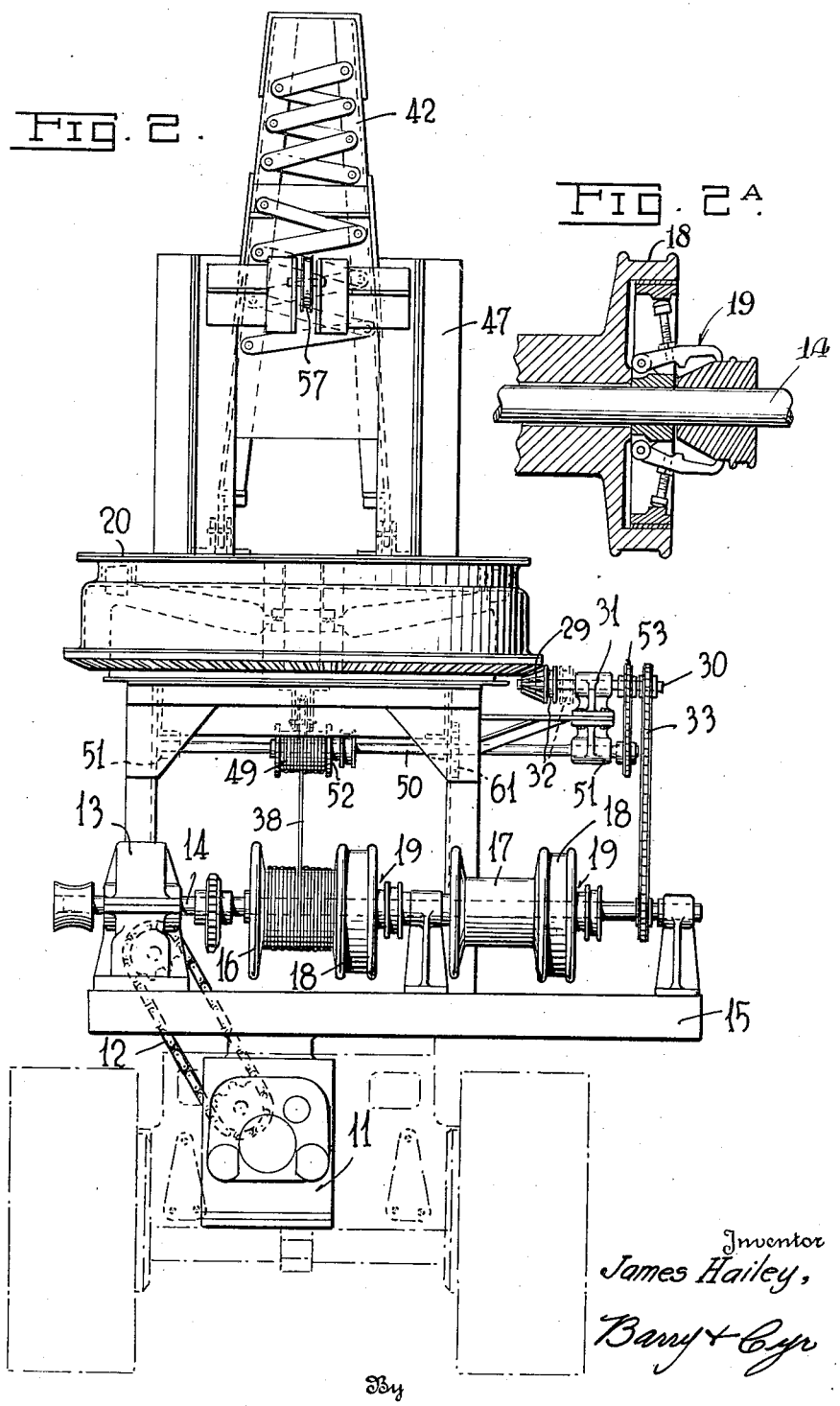

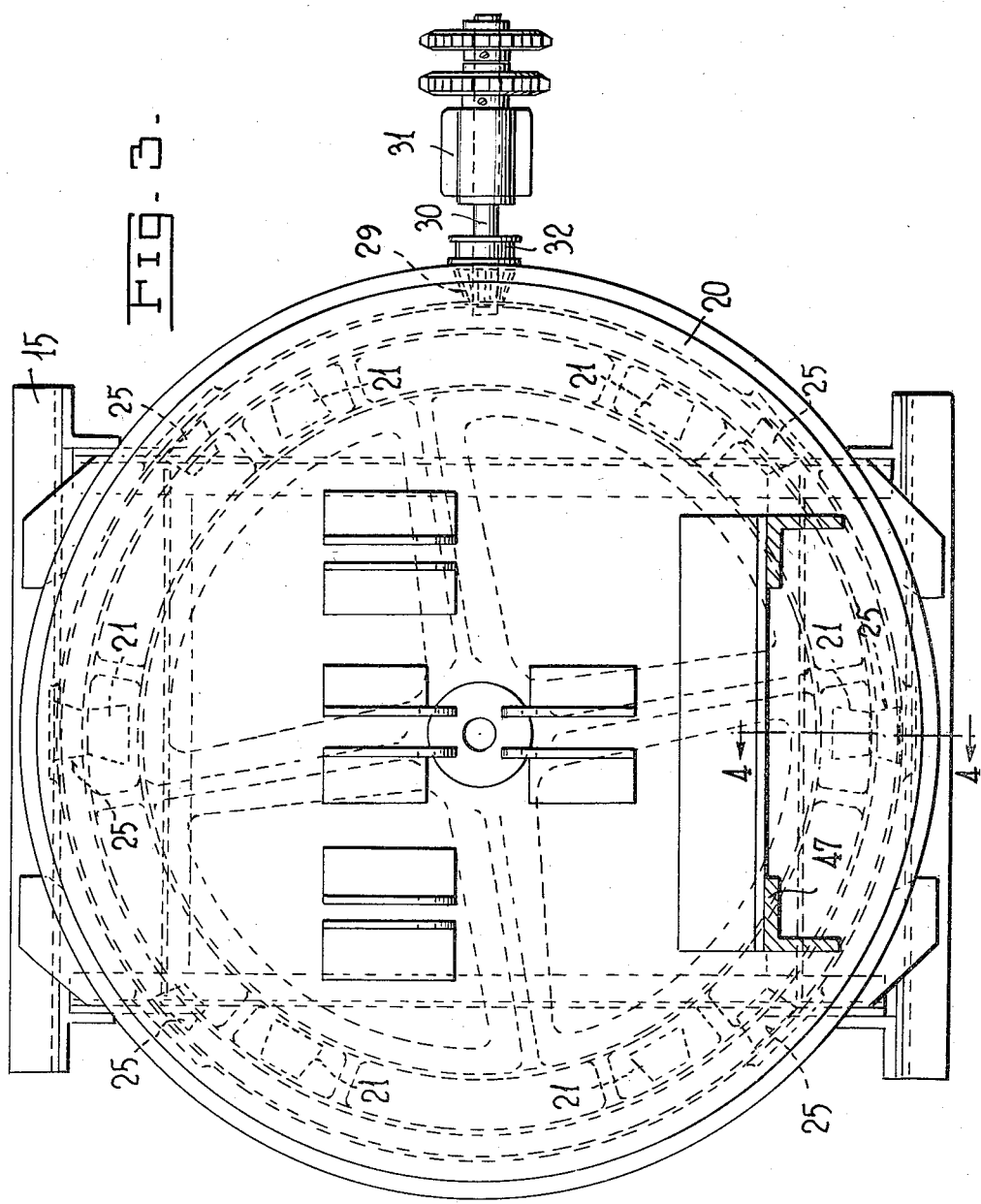

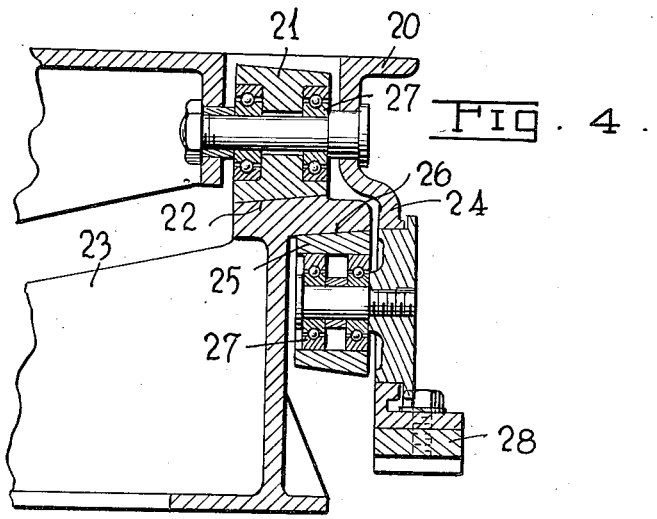
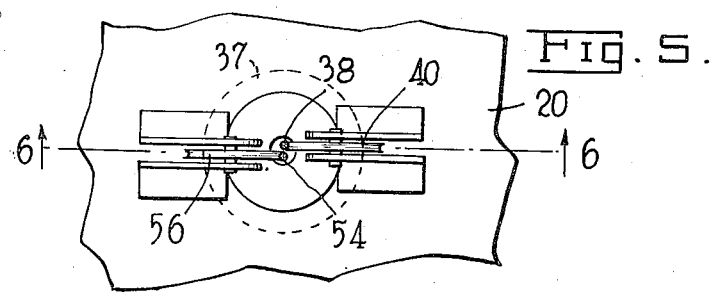
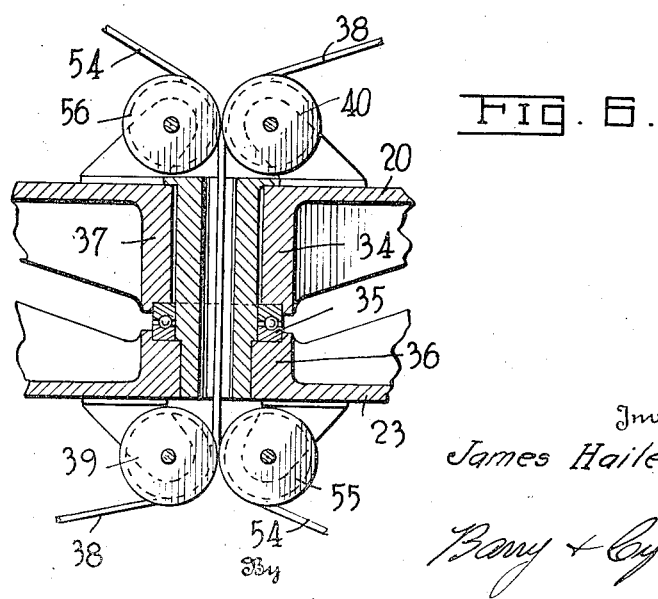

Patented Nov. 9, 1937

2,098,237

UNITED STATES PATENT OFFICE 2,098,237

FULL CIRCLE BOOM CRANE

James Hailey, Tulsa, Okla.

Application August 17, 1936, Serial No. 96,511

7 Claims. (Cl. 212—68)

This invention relates to improvements in full circle boom cranes of the type adapted to handle materials at any given point in a 360° radius while the power unit per se is in a stationary position.

Some of the objects of the invention are to provide a boom crane that is capable of picking up and carrying an object in a full circle and of making one or more complete revolutions; that may be mounted upon commercial tractors, trucks, railway flat cars or a stationary platform; that will reduce cost of construction now incurred in the building of full circle boom cranes and will increase portability and expedite the handling of any and all materials now handled by such booms; that is especially adapted for oil field work such as the handling and laying of pipe lines or conduits, loading and unloading of machinery, pipe, and all other equipment needed in such work; that can be used in all classes of work where winch and winch drums are necessary, such as pulling pipe, machinery or any and all materials across the ground, transporting the same from one position to another or pulling material from distances that are inaccessible to the boom, pulling same into a position where it can be then raised by the boom and loaded upon conveyances for transporting to its destination; that can be mounted on a truck to serve leases and for the pulling of tubing, rods or casing and the loading and unloading of the same; that can be employed for loading and unloading oil field contractors' equipment and for the rigging up and tearing down of the same; and that can be used at any point where it is necessary to load, unload or transport articles or materials.

Another object of the invention is to provide such a machine including means for instantaneously releasing the load when the tractor or power unit that is used to support the boom begins to tip.

With the foregoing objects outlined and with other objects in view which will appear as the description proceeds, the invention consists in the novel features hereinafter described in detail, illustrated in the accompanying drawings, and pointed out in the appended claims.

In the drawings:

Fig. 1 is a side elevation of my improved full circle boom crane and the operating mechanism of the same shown mounted on a conventional tractor, part of the boom being broken away to facilitate illustration.

Fig. 1a is a side elevation of the outer end portion of the boom.

Fig. 2 is a rear elevation.

Fig. 2a is a vertical sectional view of an internal friction expansion clutch forming part of my improved mechanism.

Fig. 3 is a top plan view of the rotary table of the mechanism.

Fig. 4 is a vertical sectional view of a detail taken on the line 4—4 of Fig. 3.

Fig. 5 is a plan view of the central portion of the table illustrating the means for guiding the hook line and the boom line.

Fig. 6 is a vertical sectional view of a detail taken on the line 6—6 of Fig. 5.

Referring to the drawings, 10 designates a conventional tractor which in accordance with the present invention is provided with a power take off unit 11 driven from the transmission mechanism of the tractor so that the gears of the take off unit may be driven in opposite directions. The unit 11 by means of any suitable power transmitting device such as a sprocket chain 12 is used in driving a gear reducer 13 of a conventional worm gear type to allow a shaft 14 actuated by the gear reducer to be driven by the latter, but to prevent driving of the gear reducer by the shaft 14. In other words, the gear reducer functions to lock the shaft 14 and acts as a brake to prevent the shaft 14 from rotating the gear reducer.

The shaft 14 preferably extends transversely across the tractor and is supported by a frame 15 on the latter. A hook line spooling drum 16 and a winch spooling drum 17 are loosely mounted on the shaft. Each of these drums is provided with an annular brake flange 18 and with an internal friction expansion clutch 19. The latter may be of any suitable type such as the one illustrated in Fig. 2a and this type of clutch is used in my construction to positively connect either drum to the shaft or to allow free rotation of either drum relatively to the shaft when necessary or desirable. Of course, conventional brake bands will be used with the flanges 18 and these as well as the clutches will be controlled by the operator of the tractor.

A turn table 20 is mounted on the frame 15 for complete rotation and as best shown in Figs. 3 to 6 inclusive, the table is provided with a series of frusto-conical rollers 21 which roll on an upper annular track 22 of a race 23. The table has a pendant skirt 24 carrying a series of rollers 25 which engage an overhanging lower annular track 26 forming part of the race to prevent tipping of the table on the race. The rollers 21 and 25 are preferably mounted on anti-friction bearings 27 to facilitate rotation and prevent wear.

An annular gear 28 is secured to the lower edge of the skirt and is driven by a pinion 29, loosely mounted on a shaft 30 journalled in a bearing 31 on the frame 15. A clutch 32 which may be like that shown in Fig. 2a is employed in driving the pinion 29 by the shaft 30. The latter may be continuously driven by a sprocket chain 33 actuated by the shaft 14. Obviously when the clutch 32 is "in", pinion 29 functions to rotate the table and the degree of rotation will depend upon the length of time the clutch is left in.

As best shown in Fig. 6, the hub 34 of the turn table is mounted by means of an anti-friction thrust bearing 35 on the hub 36 of the race, and a hollow king pin 37 is rigidly connected to the hub 36 and forms a vertical journal for the hub of the turn table.

A hook line 38 has one of its ends secured to the drum 16 and this line, as shown in Fig. 6, is guided by a sheave 39 that is connected to the underside of the race 23 adjacent to the king pin. From the sheave 39 the hook line passes upwardly through the king pin and over a sheave 40 mounted upon the table 20, and from the sheave 40 the line 38 extends to the hook 41 shown in Fig. 1a, as will be explained later.

A boom 42 has one of its ends hingedly connected to the top of the turn table adjacent to the axis of the latter for movement about a horizontal axis and the hook line 38 extends along the boom to a sheave 43 at the outer end of the latter. From the sheave 43 the hook line extends downwardly to a travelling sheave 44, thence about the anchor sheave 45, back to the sheave 44 and upwardly to the point of anchorage 46.

It will be obvious from the foregoing that when the drum 16 is rotated in the proper direction, the hook line 38 will be wound on the drum and will function to lift the hook 41 and the load on the latter, regardless of the position of the boom 42, and in case the load should be such as to tend to tilt the turn table, the operator can immediately release the clutch 19 of the drum 16 so as to release the load and permit it to descend with the hook.

A back brace 47 is mounted on the turn table and its upper end 48 is preferably arranged some distance above the table and spaced outwardly from the periphery thereof so as to provide a sturdy means to assist in supporting and swinging the boom. The boom swinging means comprises a boom anchor drum 49 loosely mounted on a shaft 50, the latter being rotatable in suitable bearings 51 on the frame 15. An internal friction expansion clutch 52, which may be of the type shown in Fig. 2a, is employed in rigidly connecting the drum 49 to the shaft 50, and the latter is driven by any suitable means such as a sprocket chain 53 from the shaft 31. A boom line 54 is wound on the drum 49, and as best shown in Fig. 6, it is guided by a sheave 55 carried by the race 23. The boom line also extends upwardly through the king pin and then over a sheave 56 mounted on the turn table. From the sheave 56 the boom line extends outwardly and about a sheave 57 arranged at the upper end of the back brace. Then the line is wound about double sheaves 58 and 59, mounted respectively on the boom and back brace, and is finally anchored at 60.

In order to positively lock the boom in any desired position, the boom line drum shaft 50 (Fig.1) is provided with a fixedly mounted ratchet wheel 61 that cooperates with a locking pawl 62.

From the foregoing it will be understood that the transmission mechanism of the tractor, through the instrumentality of the power take off 11 and gear 13 may be employed to drive the shaft 14 in either direction. Consequently, by means of the clutch 19 of the drum 16, the hook line 38 may be controlled to raise or lower the hook 41 for connecting it to a load and for lifting or lowering the latter. At the same time or at any other time, by controlling the clutch 32 of the pinion 29, the turn table may be rotated to swing the boom a complete circle or any portion of a revolution. Also if the clutch 52 is thrown in, the boom may be raised or lowered whenever desired, and all of these operations can be controlled by the operator of the tractor. Obviously the mechanism may be used to lift, swing or carry loads, and while the mechanism has been illustrated as mounted upon a tractor, it will be manifest that it may be mounted on any suitable motor vehicle or on a stationary platform. Of course, if it is arranged on a stationary platform, a suitable prime mover must be employed to drive the power take off 11.

The winch drum 17 may be provided with a hauling line so as to make the machine available for pulling loads toward the mechanism and to bring the same into position where they may be lifted and moved by the boom mechanism.

The herein described and illustrated embodiment of the invention has given satisfactory results in practice, and it will be apparent to those skilled in the art after an understanding of my invention, that changes and modifications may be made without departing from the spirit and scope of the invention, and it is intended that all matters contained in the above description or shown in the drawings shall be interpreted as illustrative and not in a limiting sense.

What I claim and desire to secure by Letters Patent is:

1. A full circle boom crane comprising a race having a hollow king pin, a turn table mounted on the race and rotatable about the axis of said pin, a boom hingedly mounted on the central portion of the table for movement about an axis arranged perpendicular to the axis of the king pin, a back brace mounted on the table and extending upwardly and outwardly away from the periphery of the table, sheaves carried by the upper end portion of the back brace and by the outer end portion of the boom, a sheave connected to the race and arranged below the king pin, another sheave mounted on the turn table at one side of the king pin, a boom line guided by said sheaves and having one of its ends operatively connected to the back brace, means for winding and unwinding the boom line, hook line sheaves supported by the boom, another hook line sheave mounted on the turn table at the opposite side of the king pin, another hook line sheave carried by the race and arranged below the king pin, a hook line guided by the hook line sheaves and extending through the king pin, and means for winding and unwinding the hook line.

2. In combination, a motor vehicle, a turn table mounted on the vehicle and capable of turning a complete revolution about a vertical axis, a boom hingedly mounted on said table, a hook and hook line operatively connected with the outer end of the boom, means including a boom line for swinging the boom, both of said lines passing through the central portion of the table, upper and lower guide sheaves for the lines mounted respectively above and below the table, a gear reducer driven by the motor of the vehicle, a main shaft driven by the gear reducer, a winding drum for the hook line loosely mounted on the main shaft, a clutch for connecting said drum to the shaft, means for rotating the turn table including a pinion, a pinion shaft on which the pinion is loosely mounted, a clutch for connecting the pinion to its shaft, means for driving the pinion shaft from the main shaft, a boom line shaft driven by the pinion shaft, a winding drum for the boom line loosely mounted on the boom line shaft, and a clutch for connecting the last mentioned drum to the boom line shaft.

3. A full circle boom crane comprising a race having a hollow king pin, a turn table mounted on the race and rotatable about the axis of the pin, a boom hingedly mounted on the table for movement about an axis arranged perpendicular to the axis of the king pin, a back brace mounted on the table and extending upwardly in an inclined direction outwardly away from the central portion of the table, sheaves carried by the upper portion of the back brace and by the outer end portion of the boom, a sheave connected to the race and arranged below the king pin, another sheave mounted on the turn table at one side of the king pin, a boom line guided by said sheaves and having one of its ends anchored to the back brace, means below the table for winding and unwinding the boom line, hook line sheaves supported by the boom, another hook line sheave mounted on the turn table at the opposite side of the king pin, another hook line sheave arranged below the king pin, a hook line guided by the hook line sheaves and extending through the king pin, and means for winding and unwinding the hook line.

4. A full circle boom crane comprising a portable frame, a race fixedly mounted on the frame, a turn table on the race, rollers operatively connecting the table and race for preventing the table from moving downwardly or upwardly relative to the race, a hollow king pin connecting the central portions of the table and race, a thrust bearing for supporting the table on the race, a boom hingedly mounted on the table for movement about an axis arranged perpendicular to the axis of the king pin, a back brace mounted on the table and extending upwardly and outwardly away from the periphery of the table, sheaves carried by the upper portion of the back brace and by the outer end portion of the boom, a sheave connected to the race and arranged below the king pin, another sheave mounted on the turn table at one side of the king pin, a boom line guided by said sheaves and having one of its ends operatively connected to the back brace, means arranged below the table for winding and unwinding the boom line, hook line sheaves supported by the boom, another hook line sheave mounted on the turn table at the opposite side of the king pin, another hook line sheave arranged below the king pin, a hook line guided by the hook line sheaves and extending through the king pin, and means arranged below the turn table for winding and unwinding the hook line.

5. A full circle boom crane comprising a portable frame, a race member fixedly secured to the frame and provided with an upper annular track and a lower overhanging track, a turn table mounted on the race and having rollers engaging said tracks to prevent upward or downward movement of the turn table relatively to the race, a hollow king pin connecting the central portion of the table and race, an anti-friction thrust bearing surrounding the king pin and supporting the turn table on the race, a boom hingedly mounted on the central portion of the table for movement about an axis arranged perpendicular to the axis of the king pin, a back brace mounted on the table and extending upwardly and outwardly away from the table, sheaves carried by the upper portion of the back brace and by the outer end portion of the boom, a sheave arranged below the king pin, another sheave mounted on the turn table at one side of the king pin, a boom line guided by said sheaves and having one of its ends anchored to the back brace, means below the turn table for winding and unwinding the boom line, hook line sheaves supported by the boom, another hook line sheave mounted on the turn table at the opposite side of the king pin, another hook line sheave arranged below the king pin, a hook line guided by the hook line sheaves and extending through the king pin, and means for winding and unwinding the hook line.

6. In a full circle boom crane, a portable race provided with an upper annular track and a lower overhanging track, a turn table mounted on the race, rollers connected to the turn table and engaging both of said tracks for preventing upward or downward movement of the table relatively to the race, said race having a depending skirt carrying the rollers which engage the overhanging track, an annular gear connected to the skirt, a pinion meshing with the gear for driving the latter, means for rotating said pinion, a boom hingedly mounted on the table for movement about an axis arranged perpendicular to the axis of the king pin, a back brace mounted on the table and extending upwardly and outwardly away from the periphery of the table, sheaves carried by the upper portion of the back brace and by the outer end portion of the boom, a sheave arranged below the king pin, another sheave mounted on the turn table at one side of the king pin, a boom line guided by said sheaves and having one of its ends anchored to the back brace, means arranged below the turn table for winding and unwinding the boom line, hook line sheaves supported by the boom, another hook line sheave mounted on the turn table at the opposite side of the king pin, another hook line sheave arranged below the king pin, a hook line guided by the hook line sheaves and extending through the king pin, and means below the king pin for winding and unwinding the hook line.

7. In a structure of the class described, a motor vehicle, a frame mounted on said vehicle, a race mounted on the frame and having a hollow king pin, a turn table mounted on the race and rotatable about the axis of said pin, anti-friction means cooperating with the turn table and race for limiting the movement of the table upwardly or downwardly relative to the race, a boom supported by the turn table and hingedly mounted on the central portion of the latter for movement about an axis arranged perpendicular to the axis of the king pin, a back brace mounted on the table and extending slantingly upwardly and outwardly away from the central portion of the table, sheaves carried by the upper portion of the back brace and by the outer end portion of the boom, a sheave arranged below the king pin, another sheave mounted on the turn table at one side of the king pin, a boom line guided by said sheaves and having one of its ends anchored to the back brace, means driven by the motor of the vehicle for winding and unwinding the boom line, hook line sheaves supported by the boom, another hook line sheave mounted on the turn table at the opposite side of the king pin, another hook line sheave arranged below the king pin, a hook line guided by the hook line sheaves and extending through the king pin, means driven by the motor of the vehicle for winding and unwinding the hook line, and means driven by the motor of the vehicle for rotating said turn table.

JAMES HAILEY.